(12) United States Patent
Ruan et al.

(10) Patent No.: US 7,947,957 B2
(45) Date of Patent: May 24, 2011

(54) RADIATION DETECTION SYSTEM USING A MULTICHANNEL SPECTROMETER AND METHOD THEREOF

(75) Inventors: Ming Ruan, Beijing (CN); Yingrong Jian, Beijing (CN); Kun Zhao, Beijing (CN); Jin Lin, Beijing (CN)

(73) Assignee: Nuctech Company Limited, Beijing (CN)

( * ) Notice: Subject to any disclaimer, the term of this patent is extended or adjusted under 35 U.S.C. 154(b) by 136 days.

(21) Appl. No.: 12/340,966

(22) Filed: Dec. 22, 2008

(65) Prior Publication Data

US 2009/0166542 A1 Jul. 2, 2009

(30) Foreign Application Priority Data

Dec. 29, 2007 (CN) .......................... 2007 1 0308549

(51) Int. Cl.
*G01T 1/20* (2006.01)
(52) U.S. Cl. ....................................................... 250/369
(58) Field of Classification Search ................... 250/369
See application file for complete search history.

(56) References Cited

U.S. PATENT DOCUMENTS

| | | | | |
|---|---|---|---|---|
| 4,346,590 | A | * | 8/1982 | Brown .......................... 250/256 |
| 4,804,841 | A | * | 2/1989 | Nakajima et al. ............. 250/587 |
| 2008/0191128 | A1 | | 8/2008 | Ruan et al. |

FOREIGN PATENT DOCUMENTS

| | | |
|---|---|---|
| GB | 1 395 753 | 5/1975 |
| RU | 2 267 140 | 12/2005 |
| RU | 2 300 782 | 6/2007 |
| WO | 2006/095188 | 9/2006 |

OTHER PUBLICATIONS

Aarnio et al., "Expert system for nuclide identification in gamma spectrum analysis," 1995, Journal of Radioanalytical and Nuclear Chemistry Articles, vol. 193, No. 2, pp. 219-227.*
Search Report dated Apr. 24, 2009 issued in corresponding GB Application No. 0823148.2.
Russian Office Action dated Mar. 29, 2010 issued in corresponding Russian Application No. 2008149051/28(064332).

* cited by examiner

*Primary Examiner* — David P Porta
*Assistant Examiner* — Kiho Kim
(74) *Attorney, Agent, or Firm* — Kenyon & Kenyon LLP

(57) ABSTRACT

The invention provides a data processing device for processing an reference background spectrum and a measurement spectrum of a radioactive material represented by a multichannel spectrum to acquire energy region information of detected gamma rays comprises: energy region dividing means for degenerating multichannel spectrum into a degenerated spectrum of limited channels; degenerated spectrum calculating means for calculating a background and measurement degenerated spectrum corresponding to degenerated spectrum of limited channels respectively; energy ratio calculating means for calculating a energy ratio based on the calculated background and measurement degenerated spectrum; peak-detection means, for searching a peak value in the calculated energy ratios; energy region determining information for determining a corresponding energy region of gamma rays based on the searched peak value in the energy ratios. The invention also provides a radiation detection method and a radiation detection system employing the data processing device.

9 Claims, 3 Drawing Sheets

RADIATION DETECTION SYSTEM USING A MULTICHANNEL SPECTROMETER AND METHOD THEREOF

RELATED APPLICATION

This application claims priority to Chinese Patent Application No. 200710308549.7, filed Dec. 29, 2007, which is incorporated herein by reference in its entirety.

FIELD OF THE INVENTION

The present invention relates to a radiation detection system using a multichannel spectrometer and a method used therein, particularly relates to a system for detecting radioactive materials by degenerating a multichannel spectrum produced by the multichannel spectrometer and performing a high-speed peak-detection on the degenerated spectrum, and a method used therein.

BACKGROUND OF THE INVENTION

A multichannel spectrometer (also having a type with a non-crystal and without a PMT) comprising a scintillator, a PMT, an amplifier, and a multichannel spectrometer, is used for detecting gamma rays and identifying nuclide, wherein a typical operative processing is as follows: the scintillator absorbs (or partially absorbing) the gamma rays, the crystal emits light which is collected by the PMT which performs photoelectric conversion of the light thereon and linearly multiplies it as an electrical pulse; the amplifier performs a process of shaping and amplifying the electrical pulse; then the multichannel analyzer analyzes the amplified electrical pulse and converts it into a digital signal for subsequent processings. Since the above processing is a process of linear amplification and conversion, the multichannel spectrometer may be used for detecting a spectrum of the gamma rays. At present, various radiation detection systems using the multichannel spectrometer have been developed to determine the composition and type of the radiation based on the spectrum of the gamma rays detected by the detector.

The energy range of the gamma rays involved in the field of the radiation detection is generally from 0.03 to 3 MeV. Different energy regions of the gamma rays are generally corresponding to different application fields of radioactive sources, for example, the energy of the gamma rays from special nuclear materials concentrates in a relatively low energy region, the energy of the gamma rays from radioactive material for medical uses concentrates in a middle energy region, and the energy of the gamma rays from radioactive material for industrial uses concentrates in a relatively high energy region. Therefore, the radiation detection system not only requires highly sensitive radiation detecting capability, but also needs to detect gamma rays within the wide energy range involved in the radioactive material. The existing gamma ray spectrum detection systems directly measure precise information of a spectrum so as to acquire detailed information corresponding to the radiation, thus, the process of processing needs a relatively long time, whereas based on the consideration that different energy ranges of the rays are generally corresponding to different application fields of radioactive sources, if the energy range of the detected source and the category of the radioactive material can be fast distinguished at first so as to distinguish dangerous sources and daily used medical sources, then the workload of the front line officers can be greatly reduced, and the efficiency and accuracy of the radiation detection system can be improved.

The scintillator in the multichannel spectrometer may have many types, for instance, an inorganic scintillator (NaI, CsI, BGO) and an organic scintillator (organic crystal, organic liquid, organic plastic), etc., wherein a plastic scintillator, due to its characteristics of large volume, high detection efficiency, broad range of energy spectral response, moderate price, etc., is a commonly used detector in such fields as detection of special nuclear materials and other radioactive materials, low dose environmental measurement, gamma ray spectrum measurement. However, the energy resolution of the plastic scintillator is relatively poor, so generally it is not used for energy measurement of the gamma rays and nuclide identification. Some foreign manufacturers have combined a plastic scintillator detector with the multichannel spectrometer for distinguishing natural background and artificial radioactive sources and for eliminating a change in system sensitivity caused by fluctuation of the background.

If the purpose of the radiation detection system does not lie in precise determining of the radioactive material, but lies in fast determining the category of the radioactive material, then it is possible to use the plastic scintillator detector in the multichannel spectrometer so as to fast distinguish the category of the radioactive material by using the characteristics of the plastic scintillator. Thus, what is desired is to provide a radiation detection system using a multichannel spectrometer containing a plastic scintillator so as to fast determine the category of a radioactive material.

SUMMARY OF THE INVENTION

The object of this invention is to provide a radiation detection system using a multichannel spectrometer, capable of fast distinguishing energy region of gamma ray source to be detected and the category of the radioactive material, and a method used therein.

According to one aspect of the present invention, a data processing device is provided for processing an reference background spectrum and a measurement spectrum of a radioactive material represented by a multichannel spectrum to acquire energy region information of detected gamma rays, said data processing device comprising: energy region dividing means, for degenerating said multichannel spectrum into a degenerated spectrum of limited channels, each channel of the degenerated spectrum representing an energy region; degenerated spectrum calculating means, for calculating a background degenerated spectrum and measurement degenerated spectrum based on said background spectrum and said measurement spectrum corresponding to said degenerated spectrum of limited channels respectively; measurement energy ratio calculating means, for calculating a measurement energy ratio based on the calculated background degenerated spectrum and measurement degenerated spectrum; peak-detection means, for searching a peak value in the calculated energy ratios; energy region determining information, for determining a corresponding energy region of said gamma rays based on the searched peak value in the energy ratios.

According to another aspect of the present invention, a radiation detection method is provided for processing an reference background spectrum and a measurement spectrum of a radioactive material represented by a multichannel spectrum, said method comprising steps of: degenerating said multichannel spectrum into a degenerated spectrum of limited channels, each channel of the degenerated spectrum representing an energy region; calculating a background degenerated spectrum corresponding to said degenerated spectrum based on said background spectrum; calculating a measurement degenerated spectrum corresponding to said degenerated spectrum based on said measurement spectrum; calculating a measurement energy ratio based on the calculated background degenerated spectrum and measurement degenerated spectrum; searching a peak value in the calculated measurement energy ratio; determining a corresponding energy region of said gamma rays based on the searched peak value in the measurement energy ratio.

According to another aspect of the invention, a radiation detection system is also provided, comprising a multichannel spectrometer, for generating a reference background spectrum and a measurement spectrum of a radioactive material represented by a multichannel spectrum; and a data processing device as stated above, for processing the reference background spectrum and measurement spectrum of the detected object to determine an energy region of rays of the detected object.

The radiation detection system and method according to this invention can fast distinguish an energy region of detected gamma ray sources and the category of the radioactive material, distinguish dangerous sources from daily used medical sources, largely reduce the workload of the front line officers, and improve efficiency of the radiation detection system.

In addition, this invention provides a new data processing device to improve the existing radiation detection system without substantial modification on hardware of the existing radiation detection system, thus having such characteristics as simple design, good compatibility, broad adaptation range, no need of equipping complex devices, low operation cost and soon, which is suitable for all technical fields of manufacturing and developing multichannel radiation detection apparatus.

The radiation detection system and method according to this invention are suitable for any places where the monitoring and controlling of the radioactive material are required, such as customs ports, nuclear physics laboratory, nuclear power station, nuclear waste burying place or storage house, hospital, weapon manufacturer, etc.

BRIEF DESCRIPTION OF FIGURES

These and other aspects of the radiation detection system and method according to this invention will become apparent from and will be elucidated with respect to the implementations and embodiments described thereinafter and with reference to the accompanying drawings, wherein.

DESCRIPTION OF EMBODIMENTS

Figure 1:
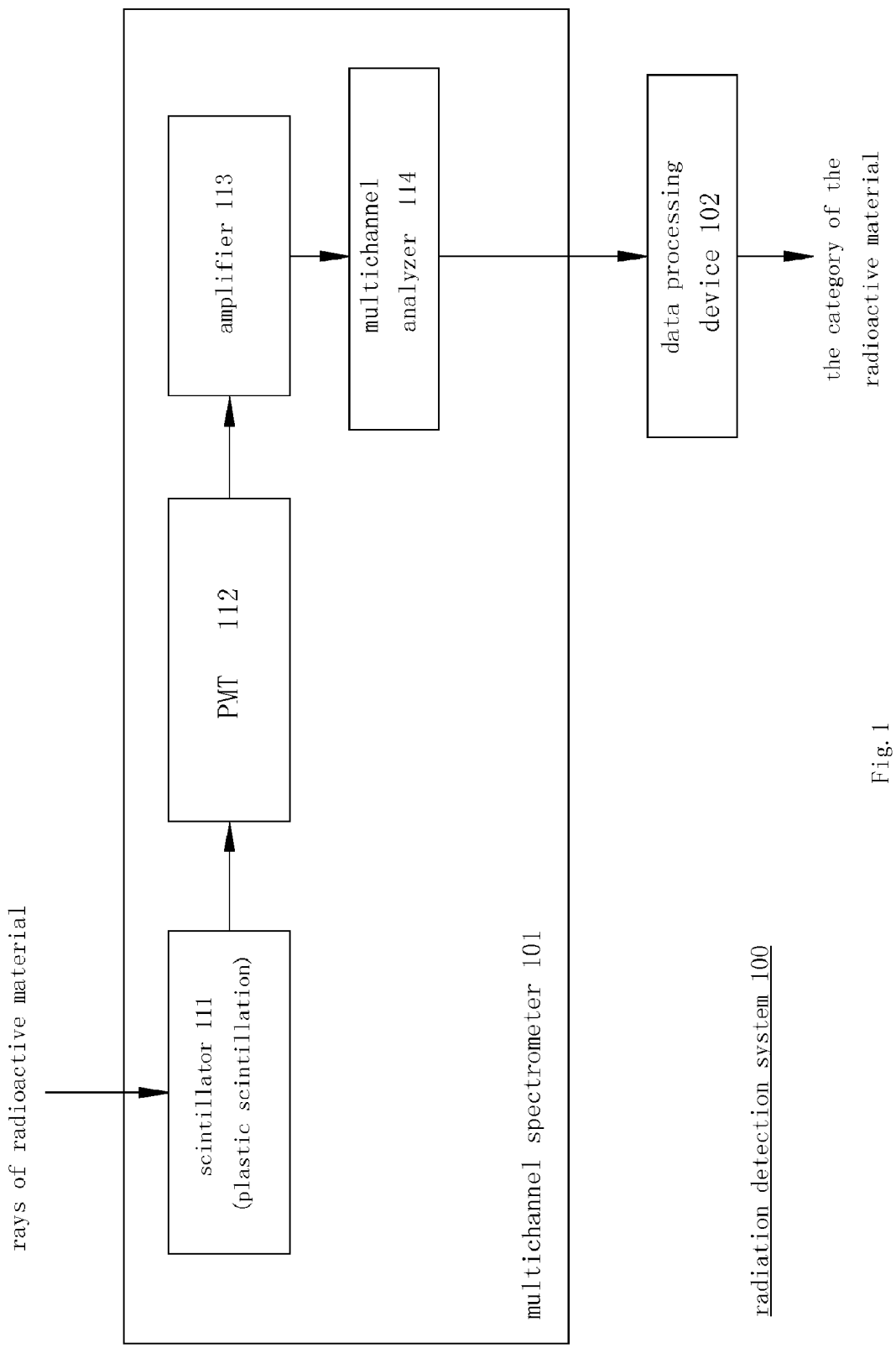
FIG. 1 shows a diagram of the radiation detection system according to an embodiment of this invention.

FIG. 1 shows a radiation detection system 100 according to a embodiment of this invention. The radiation detection system 100 comprises a multichannel spectrometer 101 and a data processing device 102. The multichannel spectrometer 101 is similar to the conventional multichannel spectrometer, comprising a scintillator 111, a PMT 112, an amplifier 113 and a multichannel analyzer 114. The multichannel spectrometer 101 acquires multichannel spectrum information of gamma rays incident into it, and may perform energy calibration of said multichannel spectrometer by means of a standard radioactive source to acquire energy calibration parameters. In one preferred embodiment, performing energy calibration of said multichannel spectrometer by means of a standard radioactive source can be expressed as:

$$E_i = A*i + B, i = 1, 2, 3, \ldots, I;$$

wherein Ei represents the energy of the $i^{th}$ channel, A and B represent calibration coefficients. Energy calibration is performed by means of a standard radioactive source so that the calibration coefficients A and B of said multichannel spectrum can be acquired, these calibration coefficients are stored for subsequent use, for example, for use during the calibration of a background spectrum and measurement spectrum, and for use in the data processing device 102.

The scintillator 111 is preferred to be a plastic scintillation crystal, because the radiation detection system 100 according to the present embodiment is used for fast distinguishing an energy region of the radioactive material and the category of the radioactive material, while not relating to the precise determining of the radioactive material, the radiation detection system 100 may sufficiently take advantage of such characteristics of the plastic scintillation crystal as large volume, high ray detecting efficiency, broad range of spectrum response, moderate price, while being not limited by the shortcoming of relatively poor energy resolution thereof on the gamma rays.

The PMT 112 and the amplifier 113 perform substantially the same functions as they do in a conventional multichannel spectrometer, in the current embodiments, the high voltage of the PMT 112 and the gain of the amplifier 113 are adjusted so that the dynamic range of the energy measured by the detection system 100 covers a energy region of a source of interest, namely covering the energy region of the radioactive material, such as 0.03-3 MeV.

The function of the multichannel analyzer 114 is also substantially similar to that of a multichannel analyzer in a conventional multichannel spectrometer, wherein energy calibration of the multichannel analyzer by means of a standard radioactive source is mainly performed in the multichannel analyzer 114 to acquire and store the energy calibration parameters A and B. In addition, the multichannel analyzer 114 further performs energy calibration of the background spectrum D and measurement spectrum d by means of the energy calibration parameters to acquire Di representing the $i^{th}$-channel of the background spectrum and di representing the $i^{th}$-channel of the measurement spectrum. Various methods known in the art can be used to perform energy calibration and perform calibration of the background spectrum D and measurement spectrum d. Thereafter, the multichannel analyzer 114 provides such relevant information as the calibrated background spectrum Di and measurement spectrum di, and the channel number I used in the multichannel spectrometer to the data processing device 102 for further processing.

The data processing device 102 receives various information provided by the multichannel analyzer 114, degenerates those multichannel spectrums into spectrums of limited channel numbers, and correspondingly degenerates the background spectrum Di and measurement spectrum di into a background degenerated spectrum Nj and a measurement degenerated spectrum Cj, calculates a measurement energy ratio Hj and performs processing of peak-detection of said energy ratio Hj to find a degenerated channel h where the peak value is located, then determines whether said searched result is correct using a predetermined threshold, and outputs an energy region corresponding to said degenerated channel h as an energy region of the detected ray source, and simultaneously outputs the category of the radioactive material corresponding to said energy region.

Figure 2:
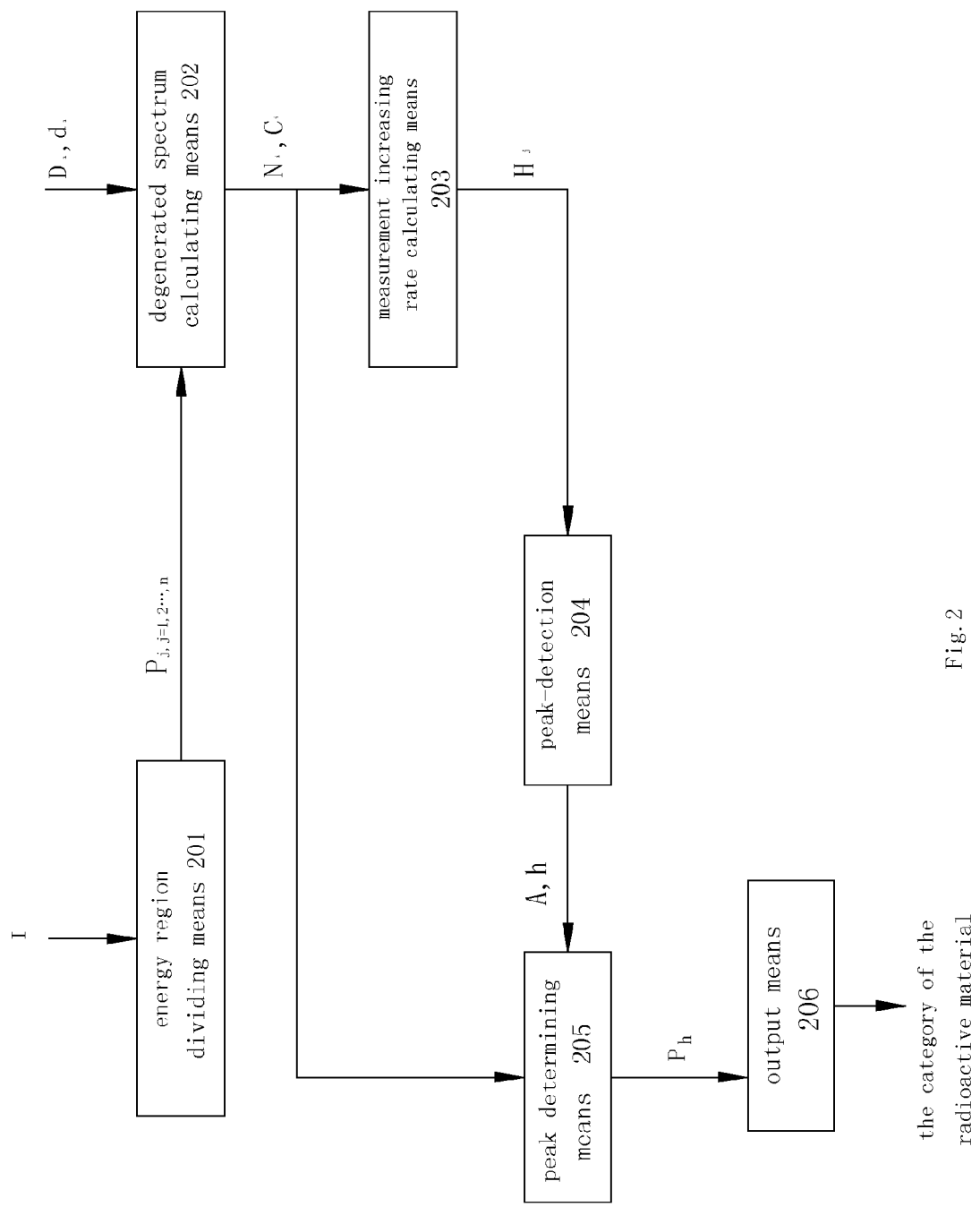
FIG. 2 shows a detailed diagram of the data processing device in the radiation detection system according to an embodiment of this invention.

FIG. 2 shows a detailed diagram of a data processing device 102 according to a embodiment of this invention. The data processing device 102 comprises energy region dividing means 201, degenerated spectrum calculating means 202, measurement increasing rate calculating means 203, energy ratio peak-detection means 204, peak determining means 205 and output means 206.

The energy region dividing means 201 receives relevant information of channels i in the multichannel spectrometer, such as the total number I of channels, a corresponding energy range of each channel, etc. According to energy regions to be detected, the energy region dividing means 201 divides the energy ranges covered by the multichannel spectrometer into a smaller number of energy regions of interest. For instance, if the radioactive materials to be detected are special nuclear materials (the energy of its gamma rays concentrate in a low-energy region) and radioactive material for medical uses (the energy of its gamma ray concentrates in a middle-energy region), then the energy range covered by the multichannel spectrometer may be divided into two energy regions. If the radioactive materials to be detected are special nuclear materials, radioactive material for medical uses and radioactive material for industrial uses (the energy of its gamma rays concentrate in a high-energy region), then the energy range covered by the multichannel spectrometer may be divided into three energy regions. Said energy regions can certainly be further divided depending on the fields to which the system is applied, so as to further distinguish sub-categories in the category of the radioactive material of special nuclear materials or the category of the radioactive material for medical uses.

Specifically speaking, the energy region dividing means 201 divides the energy range into n energy regions Pj, j=1, 2, 3, . . . n. Wherein each energy region includes multiple channels of the channels i calibrated by the multichannel spectrometer 101, the energy range of said multiple channels is identical with that covered by Pj. For example, P1=[1, 2, . . . , Ip$_1$], P2=[Ip$_1$+1, Ip$_1$+2, . . . Ip$_2$], . . . , Pn=[Ip$_{n-1}$, Ip$_{n-1}$+2, . . . , n]. The number of the channels included in each energy region Pj may be different from each other.

The degenerated spectrum calculating means 202 receives a background spectrum Di and a measurement spectrum di provided by the multichannel analyzer 114, and further receives the energy regions Pj divided by the energy region dividing means 201, and correspondingly degenerates the background spectrum Di and the measurement spectrum di into a background degenerated spectrum Nj and a measurement degenerated spectrum Cj respectively. According to a preferred embodiment of this invention, the following expressions may be used to calculate the background degenerated spectrum Nj and the measurement degenerated spectrum Cj:

$$Nj = \sum_{i=P_{j-1}}^{P_j} D_i$$

$$Cj = \sum_{i=P_{j-1}}^{P_j} d_i$$

The measurement energy ratio calculating means 203 receives the background degenerated spectrum Nj and the measurement degenerated spectrum Cj provided by the degenerated spectrum calculating means 202, and calculates a corresponding measurement energy ratio Hj=Cj/Nj.

The energy ratio peak-detection means 204 receives the measurement energy ratio Hj calculated by the measurement energy ratio calculating means 203, and determines an energy region h, where the highest peak A is located, among all the Hj. Specifically speaking, the energy ratio peak-detection means 204 may search peak values in the following logic:

```
A = H1
for(j = 1; j ≦ n; j + +){
  if (A ≦ Hj) {A = Hj; h = j;}
}
```

The peak determining means 205 receives the energy region h of the highest peak searched by the energy ratio peak-detection means 204, receives the corresponding background degenerated spectrum $N_h$ and the measurement degenerated spectrum $C_h$ from the degenerated spectrum calculating means 202, and determines whether the searched energy region h properly reflects the energy region of the current radioactive material accordint to a predetermined threshold determinant condition $C_h \geq N_h + xisu_h * (N_h)^{1/2}$. The coefficient $xisu_h$ in said threshold determinant condition can be obtained through experiments, or set based on specific user's requirements. If the energy region h of the highest peak h satisfies the above threshold determinant condition, then it can be determined that h has properly reflected the energy region of the current radioactive material. Subsequently, the output means 206 outputs corresponding information $P_h$ of the energy region, and the category of the radioactive material corresponding to the energy region $P_h$.

Therefore, the categories of the corresponding radioactive materials can be constantly determined by constantly measuring the gamma rays of the radioactive materials by means of the said radiation detection system 100 so as to constantly acquire measurement spectra, and by cooperatively operating of the above respective components, besides, the operations executed in the data processing device 102 are all simple arithmetic operations, thus, said radiation detection system 100 can fast perform the distinguishing of the categories of the radioactive materials.

Figure 3:
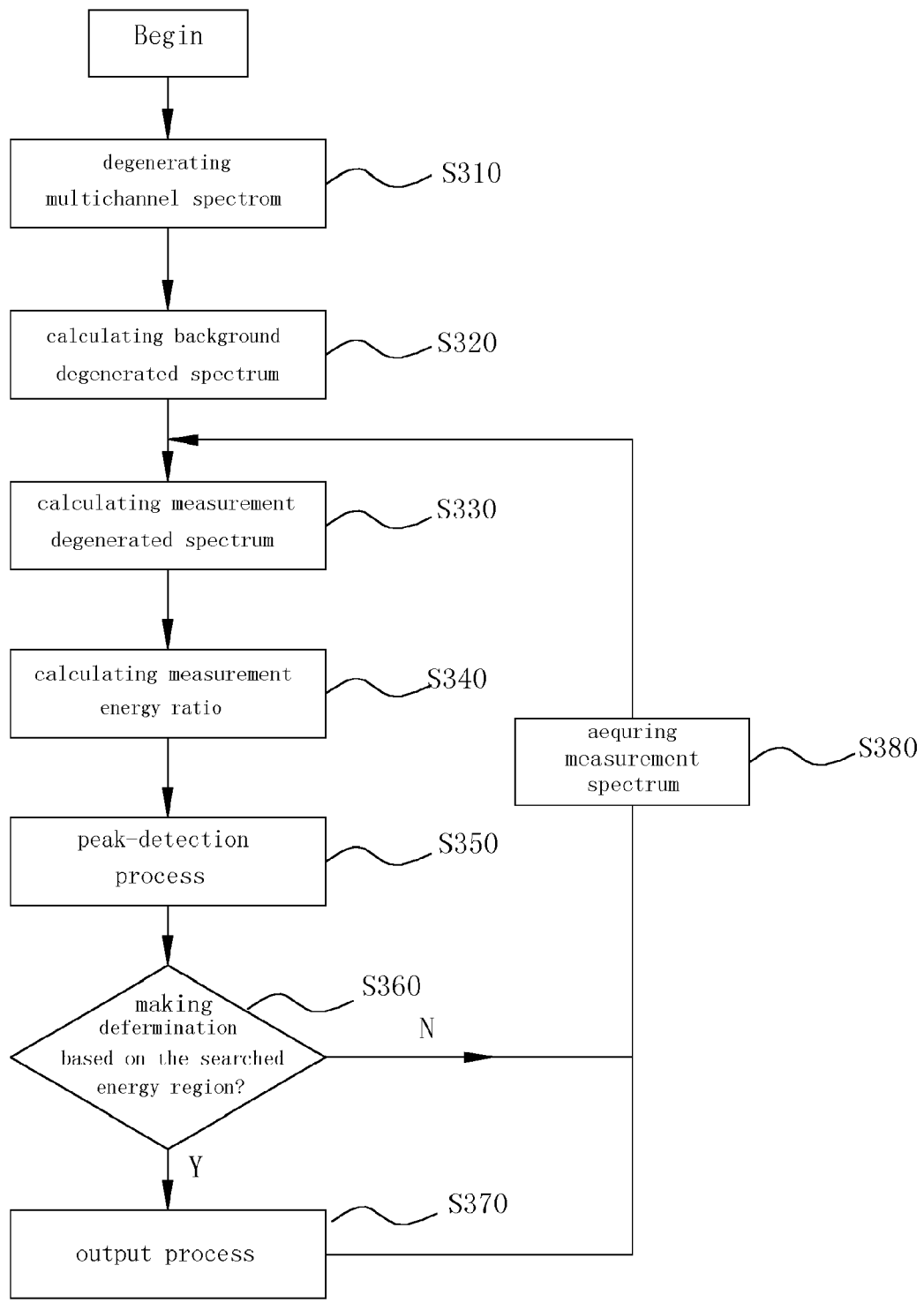
FIG. 3 shows a flow chart of the radiation detection method according to the embodiments of this invention.

FIG. 3 shows a flow chart of the radiation detection method according to an embodiment of this invention. Before the start of process shown in FIG. 3, it is assumed that the high voltage of the PMT 112 and the gain of the amplifier 113 in the radiation detection system 100 employing this said method have already been adjusted so that the dynamic range of the energy measured by said detection system 100 covers energy regions of the sources of interest. In addition, it is also assumed that the multichannel spectrometer 101 in the radiation detection system 100 has already performed energy calibration by means of a standard radioactive source thereby to acquire corresponding energy calibration parameters, and thus can obtain a normal background spectrum Di and measurement spectrum di. These assumptions are reasonable, since these processing are commonly used in the conventional multichannel spectrometer.

In Step S310, the energy range covered by the multichannel spectrometer 101 is divided into a small number of energy regions of interest. For instance, if the radioactive materials to be detected are special nuclear materials and radioactive material for medical uses, then the energy range covered by the multichannel spectrometer may be divided into two energy regions. If the radioactive materials to be detected are special nuclear materials, radioactive material for medical uses and radioactive material for industrial uses, then the energy range covered by the multichannel spectrometer may be divided into three energy regions. Certainly, said energy range can be divided in different ways or the divided energy regions can be further divided depending on the fields to which the system is applied. Specifically, the energy range is divided into n energy regions $P_j$, $j=1, 2, 3, \ldots n$. Wherein each energy region includes multiple channels of the channels i calibrated by the multichannel spectrometer 101, the energy range of said multiple channels i is identical with that included by Pj. For example, $P1=[1, 2, \ldots, Ip_1]$, $P2=[Ip_1+1, Ip_1+2, \ldots, Ip_2], \ldots, Pn=[Ip_{n-1}, Ip_{n-1}+2, \ldots, n]$. The number of the channels included in each energy region Pj may be different from each other.

In Step S320, corresponding to the degenerated and divided energy regions Pj in Step S310, the normal background spectrum Di is degenerated as a background degenerated spectrum Nj, that is, $$Nj = \sum_{i=P_{j-1}}^{P_j} D_i.$$

In Step S330, corresponding to the degenerated and divided energy regions Pj in Step S310, the normal measurement spectrum di is degenerated as a measurement degenerated spectrum Cj, that is, $$Cj = \sum_{i=P_{j-1}}^{P_j} d_i.$$

In Step S340, a corresponding measurement energy ratio $Hj=Cj/Nj$ is calculated with the background degenerated spectrum Nj and the measurement degenerated spectrum Cj.

In Step S350, an energy ratio peak-detection processing is performed to determine an energy region $P_h$, where the highest peak A is located, among all the measurement increasing spectra Hj. In detail, peak values can be searched in the following logic:

```
A = H1
for(j = 1; j ≦ n; j + +){
    if (A ≦ < Hj) {A = Hj; h = j;}
}
```

Subsequently, in Step S360, it is determined whether the searched energy region $P_h$ properly reflects the energy region of the current radioactive material according to a predetermined threshold determinant condition $C_h \geqq N_h + xisu_h *(N_h)^{1/2}$. The coefficient $xisu_h$ in said threshold determinant condition can be obtained through experiments, or set based on specific user's requirements. If it is determined that the searched energy region $P_h$ properly reflects the energy region of the current radioactive material, then the processing goes into Step S370, a corresponding energy region $P_h$ is output, as well as the category of the radioactive material corresponding to the energy region $P_h$. Subsequently, the processing returns to Step S380 and obtains a new measurement spectrum di to analyze this new measurement.

If the determining in Step S360 fails, it proves that no abnormal radioactive materials enter into the measuring system, then the processing returns to Step S380 and obtains a new measurement spectrum di to analyze this new measurement.

According to the above processings, the categories of the radioactive materials can be fast determined, since said processings do not relate to specific features of a certain radioactive material, there is no requirement of high energy resolution on the scintillator used at the front end of said measuring system, thus, this measuring system may sufficiently take advantage of such features of the plastic scintillation crystal as large volume, high efficiency of detection, broad range of spectrum response, moderate price, while being not limited to the shortcoming of poor energy resolution there of on the gamma rays.

According to the above technical solution, all the solutions of detection systems with multichannel rays (X rays, gamma, charged particles), which adopt multichannel (energy region) degeneration and identify source energy regions based on the energy ratio of the degenerated channels, belong to the protection scope of this invention.

According to the above technical solution, all the solutions of detection systems with multichannel rays (X rays, gamma, charged particles), which adopt multichannel (energy region) degeneration, use the background spectrum to fit the measurement spectrum, and identify ray source energy regions by perform peak-detection of a residual spectrum, belong to the protection scope of this invention.

It should be noted that in the data processing device 102, the components therein are logically divided dependent on the functions to be achieved, but this invention is not limited to this, the respective components in the data processing device 102 can be re-divided or combined dependent on the requirement, for instance, some components may be combined into a single component, or some components can be further divided into more sub-components.

Embodiments of the present invention may be implemented in hardware, or as software modules running on one or more processors, or in a combination thereof. That is, those skilled in the art will appreciate that a microprocessor or digital signal processor (DSP) may be used in practice to implement some or all of the functionality of all component of the data processing device 102 according to an embodiment of the present invention. The invention may also be embodied as one or more device or apparatus programs (e.g. computer programs and computer program products) for carrying out part or all of any of the methods described herein. Such programs embodying the present invention may be stored on computer-readable media, or could, for example, be in the form of one or more signals. Such signals may be data signals downloadable from an Internet website, or provided on a carrier signal, or in any other form. In one embodiment, the result obtained by the method is output to a user, e.g., by a display.

It should be noted that the aforesaid embodiments are illustrative of this invention instead of restricting this invention, substitute embodiments may be designed by those skilled in the art without departing from the scope of the claims enclosed. The word "include" does not exclude elements or steps which are present but not listed in the claims. The word "a" or "an" preceding the elements does not exclude the presence of a plurality of such elements. This invention can be achieved by means of hardware including several different elements or by means of a suitably programmed computer. In the unit claims that list several means, several ones among these means can be specifically embodied in the same hardware item. The use of such words as first, second, third does not represent any order, which can be simply explained as names.

The invention claimed is:

1. A data processing device for processing a reference background spectrum and a measurement spectrum of a radioactive material represented by a multichannel spectrum to acquire energy region information of detected rays, said data processing device comprising one or more microprocessors or digital signal processors, or software modules running on said one or more microprocessors or digital signal processors, or a combination thereof, for carrying out the steps of:
    degenerating said multichannel spectrum into a degenerated spectrum of limited channels, each channel of said degenerated spectrum representing an energy region;
    calculating a background degenerated spectrum and measurement degenerated spectrum based on said background spectrum and said measurement spectrum corresponding to said degenerated spectrum of limited channels respectively;
    calculating an energy ratio based on the calculated background degenerated spectrum and measurement degenerated spectrum;
    searching a peak value in the calculated energy ratios; and
    determining a corresponding energy region of said gamma rays based on the searched peak value in the energy ratios.

2. The data processing device as claimed in claim 1, further comprising hardware or software module or a combination thereof for outputting the category of said radioactive material corresponding to the determined energy region.

3. A radiation detection system, comprising:
    a multichannel spectrometer, for generating an reference background spectrum and a measurement spectrum of a radioactive material represented; and
    a data processing device as claimed in claim 1 or 2, for processing the reference background spectrum and measurement spectrum of the detected object to determine an energy region of the gamma rays of the detected object.

4. The radiation detection system as claimed in claim 3, wherein said multichannel spectrometer comprises a scintillator, a PMT, an amplifier, and a multichannel analyzer, the high voltage of the PMT 112 and the gain of the amplifier 113 are adjusted so that the dynamic range of energy measured by the detection system covers the energy region of the radioactive material.

5. The radiation detection system as claimed in claim 3, wherein the scintillator in said multichannel spectrometer is a plastic scintillator.

6. A radiation detection method implemented in a radiation detection system comprising a multichannel spectrometer and a data processing device, the multichannel spectrometer generating a reference background spectrum and a measurement spectrum of a radioactive material represented by a multichannel spectrum, said method being carried out by said data processing device and comprising the steps of:
    degenerating said multichannel spectrum into a degenerated spectrum of limited channels, each channel of said degenerated spectrum representing an energy region;
    calculating a background degenerated spectrum corresponding to said degenerated spectrum based on said background spectrum;
    calculating a measurement degenerated spectrum corresponding to said degenerated spectrum based on said measurement spectrum;
    calculating a measurement energy ratio based on the calculated background degenerated spectrum and measurement degenerated spectrum;
    searching a peak value in the calculated energy ratios; and
    determining a corresponding energy region of said gamma rays based on the searched peak value in the energy ratios.

7. The radiation detection method as claimed in claim 6, wherein said method further comprises a step of:
    outputting the category of said radioactive material corresponding to the determined energy region.

8. The radiation detection method as claimed in claim 6 or 7, wherein said multichannel spectrometer comprises a scintillator, a PMT, an amplifier, and a multichannel analyzer, said method further comprising a step of:
    adjusting the high voltage of the PMT and the gain of the amplifier so that the dynamic range of energy measured by the detection system covers the energy region of the radioactive material.

9. The radiation detection method as claimed in claim 8, wherein the scintillator in said multichannel spectrometer is a plastic scintillator.

* * * * *

UNITED STATES PATENT AND TRADEMARK OFFICE
CERTIFICATE OF CORRECTION

| | | |
|---|---|---|
| PATENT NO. | : 7,947,957 B2 | Page 1 of 1 |
| APPLICATION NO. | : 12/340966 | |
| DATED | : May 24, 2011 | |
| INVENTOR(S) | : Ming Ruan et al. | |

It is certified that error appears in the above-identified patent and that said Letters Patent is hereby corrected as shown below:

On the Title Page
(30) Foreign Application Priority Data:   change
"Dec. 29, 2007  (CN) ............... 2007 1 0308549" to
-- Dec. 29, 2007  (CN) ............... 2007 1 0308549.7 --.

In the Specification
Column 5, line 39, change "channel is" to -- channel i is --;

Column 7, line 51, change "if $(A \leq < H_j)$" to -- if $(A \leq H_j)$ --.

Signed and Sealed this
Twenty-second Day of October, 2013

Teresa Stanek Rea
*Deputy Director of the United States Patent and Trademark Office*